United States Patent
Mueller

(10) Patent No.: US 10,899,296 B2
(45) Date of Patent: Jan. 26, 2021

(54) METHOD FOR OPERATING A SAFETY-CRITICAL CONTROLLER FOR A MOTOR VEHICLE AND CORRESPONDING MOTOR VEHICLE

(71) Applicant: Continental Automotive GmbH, Hannover (DE)

(72) Inventor: Andreas Mueller, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 100 days.

(21) Appl. No.: 16/098,008

(22) PCT Filed: Jul. 21, 2016

(86) PCT No.: PCT/DE2016/200336
§ 371 (c)(1),
(2) Date: Oct. 31, 2018

(87) PCT Pub. No.: WO2018/014890
PCT Pub. Date: Jan. 25, 2018

(65) Prior Publication Data
US 2019/0143916 A1    May 16, 2019

(51) Int. Cl.
*B60R 16/023* (2006.01)
*G07C 5/00* (2006.01)
(Continued)

(52) U.S. Cl.
CPC ...... *B60R 16/0234* (2013.01); *B60R 16/0232* (2013.01); *B60R 21/01* (2013.01);
(Continued)

(58) Field of Classification Search
CPC . B60R 16/0234; B60R 16/0232; B60R 21/01; B60R 2021/01197;
(Continued)

(56) References Cited

U.S. PATENT DOCUMENTS

| 4,369,426 A | 1/1983 | Merkel |
| 4,641,041 A | 2/1987 | Mattes et al. |

(Continued)

FOREIGN PATENT DOCUMENTS

| DE | 29 12 547 | 10/1980 |
| DE | 196 50 176 | 6/1997 |

(Continued)

OTHER PUBLICATIONS

English translation of the International Search Report of the International Searching Authority for International Application PCT/DE2016/200336, dated Apr. 19, 2017, 3 pages, European Patent Office, HV Rijswijk, Netherlands.

(Continued)

*Primary Examiner* — Muhammad Shafi
(74) *Attorney, Agent, or Firm* — W. F. Fasse

(57) ABSTRACT

A safety-critical controller of a vehicle monitors functioning of the controller, at least one sensor and/or at least one actuator to detect an error. When specific error conditions exist, a warning for the driver is generated. It is detected whether the error is remediated within a specified time span, and if not, then corresponding error data is transmitted to a vehicle manufacturer and/or a vehicle service provider. The time span may be extended if the driver confirms the warning by operating a corresponding operating device.

5 Claims, 1 Drawing Sheet

(51) Int. Cl.
    *G07C 5/08* (2006.01)
    *B60R 21/01* (2006.01)
    *G08B 25/01* (2006.01)

(52) U.S. Cl.
    CPC ............ *G07C 5/006* (2013.01); *G07C 5/008* (2013.01); *G07C 5/0825* (2013.01); *G08B 25/016* (2013.01); *B60R 2021/0119* (2013.01); *B60R 2021/01197* (2013.01)

(58) Field of Classification Search
    CPC .......... B60R 2021/0119; G08B 25/016; G07C 5/0825; G07C 5/008; G07C 5/006; B60Y 2400/90
    USPC ....................................................... 701/31.5
    See application file for complete search history.

(56) References Cited

U.S. PATENT DOCUMENTS

| | | | |
|---|---|---|---|
| 6,470,249 B1 | 10/2002 | Schmid et al. | |
| 6,791,456 B2 | 9/2004 | Nakayama et al. | |
| 6,803,861 B2 | 10/2004 | Flick | |
| 6,842,762 B2 | 1/2005 | Raithel et al. | |
| 9,905,061 B2 | 2/2018 | Nagata et al. | |
| 2002/0093419 A1* | 7/2002 | Nakayama | B60R 25/102 340/426.1 |
| 2006/0124364 A1 | 6/2006 | Loewen et al. | |
| 2008/0316009 A1 | 12/2008 | Nagata | |
| 2013/0204943 A1* | 8/2013 | Ricci | G08G 1/096791 709/204 |
| 2014/0253313 A1 | 9/2014 | Schoenberg | |
| 2016/0010313 A1 | 1/2016 | Sugiura et al. | |
| 2016/0379423 A1* | 12/2016 | Nagata | B60R 16/0234 701/31.5 |
| 2018/0348754 A1* | 12/2018 | Samii | G05B 23/0286 |

FOREIGN PATENT DOCUMENTS

| | | | |
|---|---|---|---|
| DE | 200 15 605 | | 11/2000 |
| DE | 100 57 638 | | 5/2002 |
| DE | 102 49 440 | | 5/2004 |
| DE | 602 24 122 | | 4/2008 |
| DE | 102009014624 | | 9/2010 |
| DE | 102015219402 | | 3/2017 |
| EP | 0 167 792 | | 1/1986 |
| EP | 1 062 132 | | 6/2002 |
| EP | 2 848 437 | | 3/2015 |
| EP | 2848437 | * | 3/2015 |
| EP | 3 012 156 | | 4/2016 |
| JP | 2002-055715 A | | 2/2002 |
| JP | 2002-288768 A | | 10/2002 |
| WO | WO 2015/076280 | | 5/2015 |

OTHER PUBLICATIONS

PCT International Preliminary Report on Patentability including English Translation of PCT Written Opinion of the International Searching Authority for International Application PCT/DE2016/200336, dated Jan. 22, 2019, 7 pages, International Bureau of WIPO, Geneva, Switzerland.
French Preliminary Search Report and Written Opinion for French Patent Application No. 1756762, dated Apr. 23, 2020, 9 pages.
Partial English Summary of Japanese Office Action in Japanese Patent Application No. 2018-565647, dated Jul. 8, 2020, 2 pages.

* cited by examiner

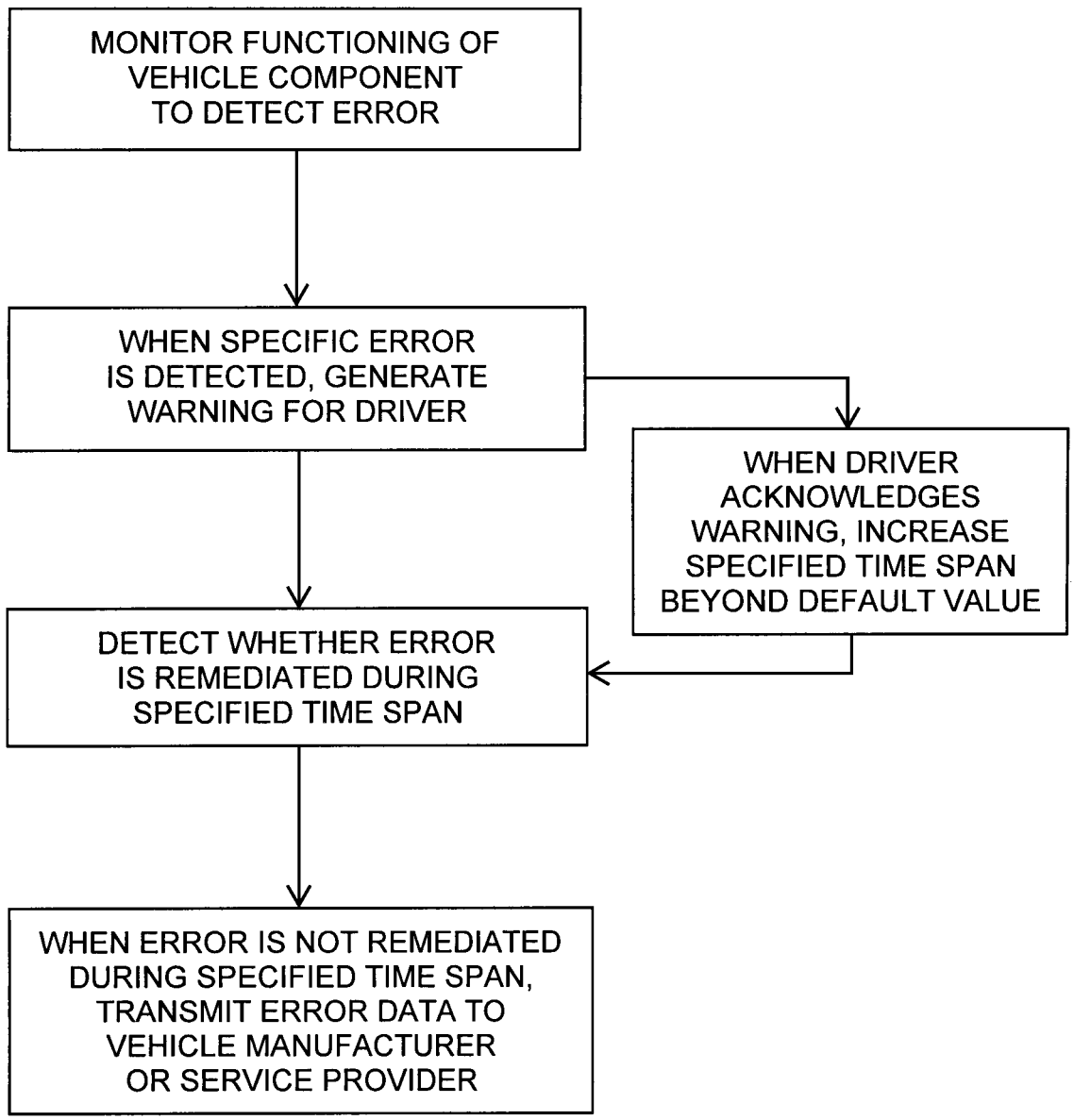

METHOD FOR OPERATING A SAFETY-CRITICAL CONTROLLER FOR A MOTOR VEHICLE AND CORRESPONDING MOTOR VEHICLE

FIELD OF THE INVENTION

The invention relates to a method for operating a safety-critical controller for a motor vehicle according to the generic part of claim 1 and thereby a corresponding motor vehicle.

BACKGROUND INFORMATION

From EP 1062132 B1 or EP 167792 A1, by way of example, methods for controlling the activation of an occupant protection system are known, in which, by way of example, the accident sensor at regular or irregular intervals carries out an internal error check and if an error is detected sends a status signal via the status signal output connection to the controller. Then, by way of example, the activation is blocked and/or an optical or acoustic warning signal is generated. Here the connection and data exchange can take place via a vehicle bus, e.g. CAN or Flexray.

In DE 10249440 A1 methods are described for monitoring the functionality of a weight-sensing system in a vehicle, in which the weight-sensing system, when a threshold value is exceeded for the force impinging on the force sensor, issues a warning message, indicating possible damage to the weight-sensing system. Here, the warning message can be displayed visually on an instrument cluster of the vehicle, particularly as text and or/in the form of an indicator light. It is also proposed that the warning message is given on a CAN (car area network)-bus and/or stored in an error memory.

From DE 102009014624 A1 a method is also known for displaying malfunctions in the motor vehicle with self-diagnostics-capable controllers, which in the event of a malfunction issue a warning to the driver. At the same time as the warning is issued, as a function of the severity of the error, a recommended action is shown, acknowledgement of which must be given by the driver. This display is preferably only deleted once the driver has given their acknowledgement. Alternatively, or additionally, according to a further development of the invention a safety mode is activated if the acknowledgement is not given within a specified time window.

For all that, it is impossible to rule out that the driver will overlook, ignore or forget this warning and that the vehicle will be left for a long time in this state without an operational occupant protection system or other safety-critical controller.

Furthermore, by way of example from DE 29 12 547 C2 and DE 196 50 176 A1 automatic emergency call systems for vehicles are known, by means of which in the event of an accident the emergency services can be automatically informed and guided to the precise scene of the accident, in order provide a reliable guarantee of timely assistance.

SUMMARY OF THE INVENTION

An object of the present invention is to further increase the above mentioned reliability. This object can be achieved by a method and a motor vehicle respectively having the features of the invention as set forth herein.

It is therefore provided that a corresponding data transmission to a vehicle manufacturer and/or service provider takes place, if within a specified time span the error has not been cleared. Apart from clearance, if necessary a corresponding error entry can be confirmed as repaired, or deleted, by an appropriate service engineer.

From the non-prior art DE 10 2015 219 402 of the same applicant as this patent application, a method for operating an occupant protection system has previously been described, wherein the occupant protection system comprises at least one controller, at least one sensor and at least one occupant protection means, and a controller monitors the correct functioning of the controller, of at least one sensor or at least one actuator, or a plurality of these, and where specific error conditions exist a warning for the driver is generated. For at least a subgroup of error conditions an appropriate warning message is given as a warning to the driver, which must be confirmed by the driver by operating at least a specified operating means. If the warning message is not confirmed within a specified time span by operating the specified operating means, a corresponding data transmission to a vehicle manufacturer or service provider takes place. In doing so, however, no check is made on whether the error has been cleared.

BRIEF DESCRIPTION OF THE DRAWING

In order that the invention may be clearly understood, it will now be explained in further detail with reference to the accompanying drawing, wherein the single drawing FIGURE is a schematic flow diagram of a basic example embodiment of a method according to the invention.

DETAILED DESCRIPTION OF EXAMPLE EMBODIMENTS OF THE INVENTION

The single drawing FIGURE schematically represents a flow diagram of an example embodiment of a method of operating a safety-critical controller of a vehicle, according to the invention. The method involves using the controller to monitor functioning of a vehicle component selected from the group consisting of the controller, at least one sensor, and at least one actuator. This monitoring is to detect an error that occurs in the functioning of the at least one vehicle component. When the detected error comprises at least one of specific error conditions, then the method proceeds by generating a warning for the driver of the vehicle. Next, the method detects whether the error has been remediated during a specified time span. Then, only when the error has not been remediated within the specified time span, the method proceeds by transmitting corresponding data indicative of the error to a vehicle manufacturer and/or a vehicle service provider of the vehicle.

The single drawing FIGURE further shows an additional step of another embodiment, as follows. The specified time span for clearing or remediating the error, or until data transmission takes place is preferably changed from a first time value to a longer second time value, if the driver, by operating a specified operating means, confirms the warning message, wherein the longer, second time span is also not unlimited. Thus, in an envisaged exemplary embodiment, without confirmation of the error message by the driver, the data transmission takes place in a relatively short time from a few minutes to a maximum of days, whereas on the other hand following confirmation of the error message by the driver, then the time remaining for repair will range from a few days up to weeks, but in any event even following expiry of this second time span a data transmission will take place if the error has not been remediated.

Here the data transmission preferably takes place via a mobile telephone, an available mobile radio data connection or SMS and in the process preferably contains vehicle-identifying data, the type of error condition and the time of occurrence of the error conditions or expiry of the time span without operation of the operation means having taken place. Through the data transmission the vehicle manufacturer or service provider can then make contact with the driver via other channels, be this telephone, e-mail or similar and avoid continued driving without an intact safety-critical controller.

With the first data transmission, a new time window is preferably started, and the data transmission is repeated cyclically, where no clearance of the error has been detected before expiration of the time window.

It makes no difference here if the method is performed in the safety-critical controller or another controller and if only one sensor, an occupant protection means or the correct functioning of the controller itself is monitored. In addition, the warning message to be confirmed by the operation of at least one specified operating means can also be given for just a sub-group of error conditions, and thus not necessarily for all error events.

The warning message to the driver can be given visually or acoustically, as a pictogram or in various languages and apart from the reference to the malfunction of the occupant protection system preferably contains a reference to an early visit to the workshop, the need for confirmation and the consequences of non-confirmation.

For confirmation here an operating means, its operation, or a plurality or sequence of operating means is preferably selected such that an inadvertent "confirmation", that is, operation without the intention of confirmation during normal driving operations, can be excluded to the greatest possible extent.

The operation is preferably logged by the driver by operating the specified operating means in a memory, by way of example the time of confirmation is stored in the memory, e.g. it is not for instance just that of the occurrence of the error and the warning, but similarly and separately from this also the actual operation by the driver that is stored.

If the warning message is not confirmed within a specified time span by operation of the specified operating means, apart from the data transmission a restriction is preferably placed on the vehicle. This is of course wholly dependent on the desired escalation and must be set according to the individual vehicle.

One or more of the following actions in particular is/are envisaged:
a) that the warning message remains permanently overlaid;
b) that convenience features such as radio are not possible or a telephone can only be used for emergency calls;
c) that a speed restriction is activated;
d) and/or that a restart of the vehicle following a stop is prevented.

Accordingly, a safety-critical controller, be this the display controller, ESP controller or the occupant protection system, is equipped with a suitable algorithm for performing the method and a data interface with a means for issuing the warning message and for receiving a signal from the specified means of operation or for querying the means of operation and has an interface to data transmission means.

Thus, in a motor vehicle an appropriately equipped controller and means for issuing the warning message and data transmission are provided or an existing means is arranged to perform the method.

The invention claimed is:

1. A method of operating a safety-critical controller of a vehicle, comprising:
   with the controller, monitoring a functioning of at least one component selected from the group consisting of the controller, at least one sensor, and at least one actuator, to detect an error that occurs in the functioning of the at least one component,
   when the error comprises at least one of specific error conditions, then generating a warning for a driver of the vehicle, wherein for at least a subgroup of the error conditions, the warning comprises an appropriate warning message which is given to the driver,
   detecting whether the error has been remediated during a specified time span, and
   transmitting corresponding data indicative of the error to a vehicle manufacturer and/or a vehicle service provider of the vehicle, only when a remediation of the error has not been detected within the specified time span.

2. The method according to claim 1, further comprising:
   detecting whether the driver, by operating a specified operating device, acknowledges the warning,
   setting the specified time span to a default time value when the warning is not acknowledged by the driver's operation of the specified operating device, and
   setting the specified time span to a longer time value greater than the default time value when the warning is acknowledged by the driver's operation of the specified operating device.

3. The method according to claim 1, further comprising starting a time window upon the transmitting of the data, and cyclically repeating the transmitting of the data when a remediation of the error has not been detected during the time window.

4. The method according to claim 2, wherein the data contains at least one of: vehicle-identifying data, a type of error condition represented by the error, a time of occurrence of the error, and/or a time of occurrence of the acknowledging of the warning by the driver's operation of the operating device.

5. A motor vehicle comprising a vehicle body and an apparatus, wherein:
   the apparatus comprises a controller, a warning output device, and a data transmitter,
   the controller is configured to monitor a functioning of at least one component selected from the group consisting of the controller, at least one sensor, and at least one actuator, to detect an error that occurs in the functioning of the at least one component,
   the warning output device is configured to generate a warning for a driver of the vehicle when the error comprises at least one of specific error conditions, wherein for at least a subgroup of the error conditions the warning comprises an appropriate warning message which is given to the driver,
   the controller is further configured to detect whether the error has been remediated during a specified time span, and
   the data transmitter is configured to transmit corresponding data indicative of the error to a vehicle manufacturer and/or a vehicle service provider of the vehicle, only when a remediation of the error has not been detected within the specified time span.

* * * * *